United States Patent [19]
Rasch et al.

[11] Patent Number: 5,714,846
[45] Date of Patent: Feb. 3, 1998

[54] MINIMUM HARMONIC DISTORTION OPERATING CIRCUIT FOR AT LEAST ONE LOW-PRESSURE DISCHARGE LAMP

[75] Inventors: Erhard Rasch, Ottobrunn; Eugen Statnic, Munich, both of Germany

[73] Assignee: Patent-Treuhand-Gesellschaft F. Elektrische Gluehlampen mbH, Munich, Germany

[21] Appl. No.: 448,751

[22] Filed: May 24, 1995

[30] Foreign Application Priority Data

Jul. 7, 1994 [DE] Germany .................. 9410910 U

[51] Int. Cl.$^6$ ................................. H05B 41/36
[52] U.S. Cl. .................. 315/225; 315/209 R; 315/205; 363/44; 363/45; 363/50; 323/908
[58] Field of Search ................ 363/44, 45, 50; 323/908; 315/209 R, 205, 225, 219

[56] References Cited

U.S. PATENT DOCUMENTS

| | | | |
|---|---|---|---|
| 4,808,887 | 2/1989 | Fahnrich et al. | 315/247 |
| 5,049,788 | 9/1991 | Lee | 315/219 |
| 5,130,610 | 7/1992 | Kakitani | 315/219 |
| 5,387,847 | 2/1995 | Wood | 315/209 R |

FOREIGN PATENT DOCUMENTS

| | | |
|---|---|---|
| 0 600 340 | 6/1994 | European Pat. Off. . |
| 0 602 908 | 6/1994 | European Pat. Off. . |
| 2836325 | 2/1980 | Germany ................... 363/45 |
| 0200763 | 10/1985 | Japan ..................... 363/45 |
| WO 92/22953 | 12/1992 | WIPO . |

*Primary Examiner*—Robert Pascal
*Assistant Examiner*—Arnold Kinkead
*Attorney, Agent, or Firm*—Frishauf, Holtz, Goodman, Langer & Chick, P.C.

[57] ABSTRACT

To substantially reduce harmonic distortion and improve the power factor of an operating circuit for a fluorescent lamp, a smoothing circuit (G) is interposed between the outputs from a power rectifier (GL) and an inverter (WR) supplying the fluorescent lamp (L) with high-frequency energy. The smoothing circuit includes a two electrolytic capacitor (C1, C2)—three diode (D1, D2, D3) network, which is so connected, and the diodes so polarized that, during charging of the capacitors, a series circuit is established with one (D2) of the three diodes in series with the two capacitors. For discharge of the capacitors to supply the inverter when the rectified voltage is lower than the capacitor voltage, the two capacitors (C1, C2), through the other two diodes (D1, D3), are connected in parallel to supply the inverter. To substantially reduce harmonic distortion to less than about 30% and improve the power factor of the circuit to above 0.95, a parallel resistor-capacitor (RC) circuit is connected between two junctions (V1, V2) serially with the series connected diode (D2). The resistor (R1), in combination with the capacitors, reduces, and time-delays, inrush current upon charging of the capacitors (C1, C2). The capacitor (C3) connected in parallel to the resistor (R1) permits backflow of high-frequency current from the inverter to the electrolytic capacitors (C1, C2), thus preventing transfer back to the network supply.

8 Claims, 2 Drawing Sheets

MINIMUM HARMONIC DISTORTION OPERATING CIRCUIT FOR AT LEAST ONE LOW-PRESSURE DISCHARGE LAMP

Reference to related patents, the disclosures of which are hereby incorporated by reference:

U.S. Pat. No. 4,808,887, Fahnrich et al, assigned to the assignee of the present application;

U.S. Pat. No. 5,049,788, Lee;

U.S. Pat. No. 5,130,610, Kakitani (to which EP 440 244 A2 corresponds).

FIELD OF THE INVENTION

The present invention relates to an operating circuit for at least one low-pressure discharge lamp, typically a fluorescent lamp, which includes a smoothing circuit in its input, so that a minimum of harmonic distortion will be reflected into a power supply circuit and in which circuit, further, the power factor will be high.

BACKGROUND

Operating circuits for low-pressure discharge lamps, typically fluorescent lamps, utilize accessory circuits, historically called ballasts, which preferably are electronic circuits. They may be separate from the lamps, for example in separate ballast or adapter or accessory circuit units, or integrated with the lamps in the bases thereof. Particularly when used with compact fluorescent lamps, the operating circuits are frequently part of the base, so that the base of the lamp can be directly connected as a replacement element into a standard incandescent lamp socket. The circuit should have a very low harmonic distortion factor, that means introduce lowest distortion into the network supply, while also having a very high power factor.

Various circuits to accomplish this object have been proposed, and one of them is described in the referenced U.S. Pat. No. 5,049,788, Lee. The circuit of the Lee patent uses, as is customary in many such operating circuits, a half-bridge or push-pull inverter connected to an inductance—capacitance (LC) output circuit which, in turn, provides the energy supply to one or more low-pressure discharge lamps. The inverter is supplied by rectified network voltage. The rectifier arrangement includes a bridge rectifier and, to reduce harmonics and improve the power factor, two electrolytic capacitors are connected in parallel to the input to the inverter. Three rectifier diodes are interconnected with the two electrolytic capacitors and so polarized that, during charging of the electrolytic capacitors, the capacitors are connected in series. During discharge, the capacitors are connected in parallel with respect to each other. The power factor of such circuits is in the range of between about 0.83 and 0.90; harmonic distortion is between about 45% to 55%.

THE INVENTION

It is an object to provide a circuit to operate at least one low-pressure discharge lamp, for example and typically a fluorescent lamp, which has a power factor higher than previously attainable, for example higher than 0.95, and a harmonic distortion factor below 30%.

Briefly, the circuit is similar to that of the prior art, including the smoothing circuit. In addition, however, and to obtain the substantially lower harmonic distortion factor and the substantially higher power factor, a parallel resistance—capacitor circuit is provided, and so connected that the parallel resistance—capacitor circuit is in series with the diode which is conductive when the capacitors are being charged, whereas the capacitor is in parallel therewith to bypass harmonics which are generated in operation of the inverter and flowing back to the electrolytic capacitors.

Basically, therefore, the harmonic suppression and power improvement circuit is interconnected with the two-capacitor—three-diode (2C-3D) network in such a way that the resistor reduces peak inrush currents during charging of the capacitors while permitting flow of high-frequency harmonics generated by the inverter into the electrolytic capacitors during discharge thereof.

Overall, the circuit in accordance with the present invention utilizes a half-bridge inverter supplied with direct current, which is obtained from a power network via a bridge rectifier to which the 2C-3D smoothing circuit is connected. The 2C-3D smoothing circuit has two electrolytic capacitors and three rectifier diodes. The three rectifier diodes are interconnected with the two electrolytic capacitors in such a manner that they are integrated between the network rectifier and the input to the inverter such that the electrolytic capacitors, during their charging phase, are connected in series with respect to each other, and with one of the diodes, whereas during discharging they are connected in parallel with respect to each other through the diodes.

In accordance with the present invention, this smoothing circuit further includes an ohmic resistor and a parallel-connected capacitor. The capacitor bridges the resistance for high-frequency voltages, which are usually in the range of between about 30 kHz to 200 kHz, that is, substantially higher than power network frequency. These are customary inverter frequencies for use/fluorescent lamps. During charging, the ohmic resistor is connected in series with the two electrolytic capacitors by the diodes, and thus current which charges the capacitors, flows therethrough. This resistance has a smoothing function for the network current by reducing the charging peak, and increasing the charging time. The capacitor connected in parallel to this resistor improves the ability of the fluorescent lamps to fire by bridging the ohmic resistor of the smoothing unit for the high-frequency free-wheeling current flowing from the inductance-capacitance output circuit of the inverter to the electrolytic capacitors of the smoothing circuit. By modifying and expanding the known 2C-3D smoothing circuit, harmonic distortion of the network current can be reduced to a value below 30%, and the power factor can be improved to a value of above 0.95.

DRAWINGS

FIG. 1 is a highly schematic circuit diagram illustrating the present invention; and FIG. 2 is a detailed schematic circuit diagram of an operating circuit including the present invention for a 20 W fluorescent lamp, operated from a 120 V alternating current network supply.

DETAILED DESCRIPTION

Figure 1:
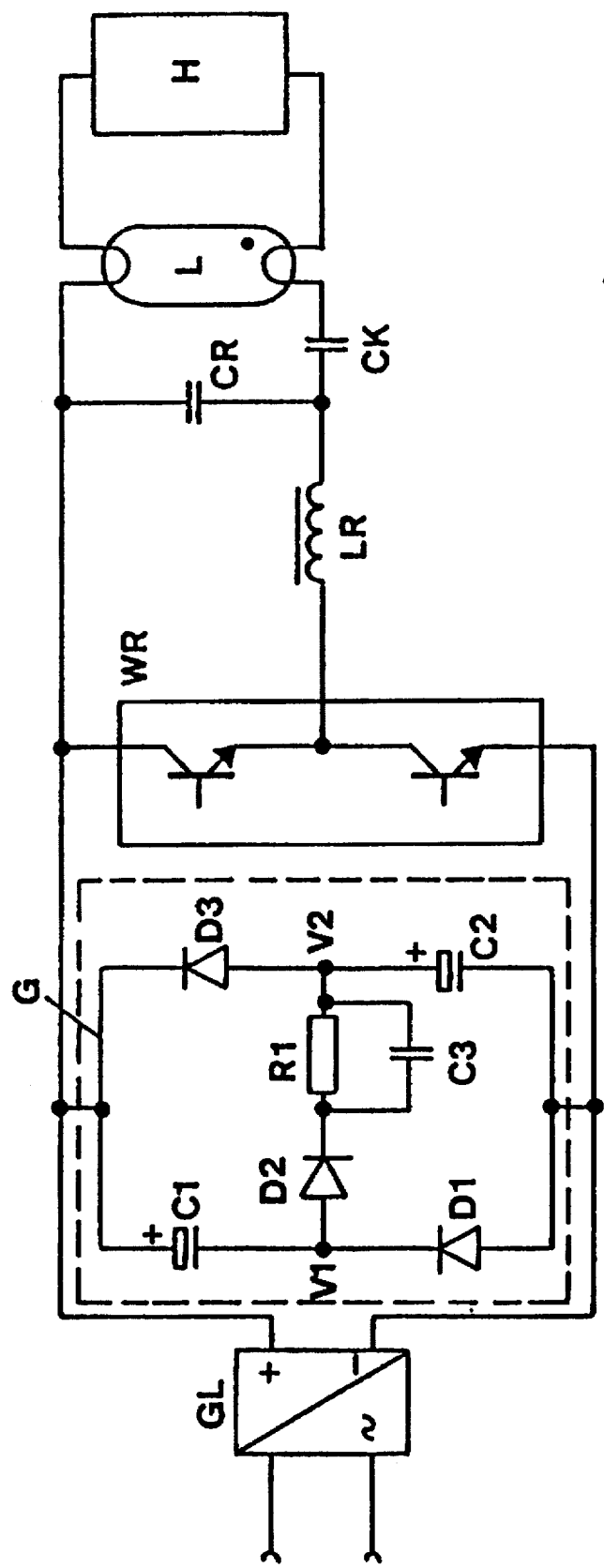

The basic principle of the circuit in accordance with the present invention is best seen in FIG. 1, in which alternating current input at power network frequency is rectified in a rectifier, for example a bridge rectifier GL. The so rectified supply is inverted in an inverter WR, connected to a series resonance circuit having a resonance inductance LR and a resonance capacitor CR. A coupling capacitor CK connects the resonance circuit to the low-pressure discharge lamp L.

The lamp L has preheatable electrodes. An electrode preheating circuit H is connected to the lamp for preheating of the electrodes. The inverter WR is supplied with the rectified network voltage from the rectifier GL. A network smoothing circuit G is connected in parallel to the output of the network rectifier GL and, hence, to the input of the inverter WR. The network rectifier GL includes a 2 capacitor—3 diode (2C–3D) circuit, formed of two electrolytic capacitors C1, C2 and three rectifier diodes D1, D2, D3.

In accordance with the present invention, an ohmic resistor R1 and a capacitor C3 further form part of the smoothing circuit G. The diodes are so polarized and so interconnected with the circuit formed by the resistor R1 and the parallel-connected capacitor C3 that, during charging, the two electrolytic capacitors C1, C2 are serially connected via the junction V1 and the rectifier diode D2, which is polarized in current passing direction, as well as the resistor R1, and the junction V2.

OPERATION

Upon connection of the rectifier GL to a power network, energy with the polarity shown in FIG. 1 is supplied across the smoothing circuit G. During charging, the electrolytic capacitors C1, C2 are charged in the charging path C1—junction V1—diode D2—resistor R1—junction V2—capacitor C2. Charging of the capacitors through the resistor R1 continues as long as the supply voltage, furnished by the network rectifier GL, instantaneously, is higher than the sum of the voltages $U_{C1}$, $U_{C2}$, on the electrolytic capacitors. If the electrolytic capacitors are identical, this voltage will be larger than 2 $U_{C1}$. During charging, the inverter supply voltage corresponds to the instantaneous rectified network voltage.

The ohmic resistor R1 reduces the inrush current pulse by reducing the amplitude of the capacitor charging current by about 65% and increases the charge time. In the embodiment to be described below, the charge time is increased by about 0.8 ms.

The capacitor C3 is connected in parallel to the resistor R1. During oscillation of the inverter WR, capacitor C3 bridges the resistor R1 for the high-frequency return current flowing from the series resonance circuit into the electrolytic capacitors C1, C2. The harmonic distortion factor of the circuit is reduced to a value of below 30%, while the power factor is increased to a value of above 0.95.

When the instantaneous rectified network voltage drops below the value 2 $U_{C1}$, network current flows directly to the inverter WR. The charging current is 0 and the supply voltage for the inverter WR corresponds to the instantaneous rectified network voltage.

In the period of time when the instantaneous/rectified network voltage has values below the capacitor charge voltage $U_{C1}$, electrolytic capacitors C1 and C2 discharge over the rectifier diodes D1, D3, respectively. The two electrolytic capacitors C1, C2, during the discharge phase, are connected in parallel with respect to each other. The inverter supply voltage is then determined by the temporal course of the capacitor voltage $U_{C1}$.

Figure 2:
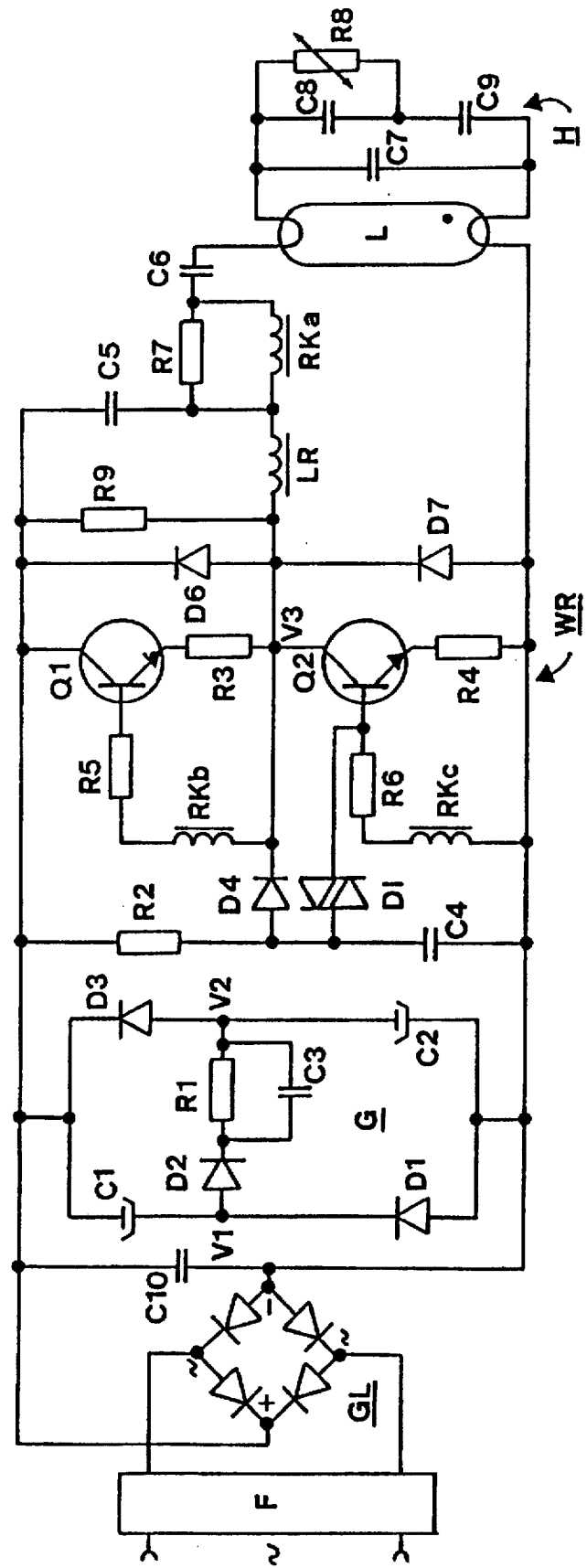

The circuit in accordance with the invention, to operate a 20 W fluorescent lamp from a 120 V network voltage is shown in FIG. 2. Table 1 lists the dimensions of the various components used in the circuit. The circuit includes a self-oscillating half-bridge push-pull inverter which, essentially, is formed by the switching transistors Q1, Q2 and transformer windings RKa, RKb, RKc. Secondary windings RKb and RKc are connected, each, over a base resistor R5 or R6, respectively, to the base terminals of the transistors Q1, Q2. The primary winding RKa is integrated in the series resonance circuit which is connected to the center junction V3 between the transistors Q1, Q2. Free-wheeling diodes D6, D7 are connected in parallel to the switching paths of the transistors Q1, Q2, to protect the collector-emitter paths with respect to excessive voltage peaks or overloads.

The series resonance circuit includes the resonance inductance LR, resonance capacitors C5, C7, the primary winding of the transformer RKa, ohmic resistors R7 and R9, coupling capacitor C6, as well as the 20 W compact fluorescent lamp L, having preheatable electrode filaments. The electrode heater circuit H is connected in parallel to the lamp L and includes two capacitors C8, C9 and a positive temperature coefficient (PTC) resistor R8. During the electrode preheating phase, the PTC resistor R8 bridges the capacitor C8 and prevents premature ignition of the lamp. The half-bridge inverter is started to oscillate by a starting circuit formed by the ohmic resistor R2, diode D4, capacitor C4 and a diac D1. The capacitor C4 is charged over resistor R2 to the breakdown voltage of the diac DI, which then generates the trigger pulses at the base of the transistor (or transistors) Q2. The ohmic resistor R9 functions as starting resistor for the half-bridge inverter WR.

The bridge rectifier GL supplies d-c supply voltage for the half-bridge inverter Q1, Q2. It is connected through a harmonic filter F to a 120 V alternating current supply. A capacitor C10 is connected in parallel to the d-c output of the bridge rectifier GL. The waviness of the pulsating d-c voltage provided by the bridge rectifier GL is smoothed by the smoothing circuit G, which includes the two electrolytic capacitors C1, C2, the three diodes D1, D2, D3, the ohmic resistor R1 and capacitor C3. This circuit, likewise, is connected across the input of the inverter Q1, Q2. The positive terminal of the electrolytic capacitor C1 and the cathode of the rectifier diode D3 are connected to the positive output of the rectifier GL and the collector terminal of the switching transistor Q1. The negative terminal of the electrolytic capacitor C1 is connected over a first junction V1 to the cathode of the diode D1. The negative terminal of electrolytic capacitor C2 and the anode of the rectifier diode D1 are connected to the negative output of the bridge rectifier GL, and to the emitter terminal of the switching transistor Q2. The positive terminal of the electrolytic capacitor C2 is connected to a second junction V2 and then to the anode of the rectifier diode D3. The rectifier diode D2 is polarized in current passing direction between the first junction V1 and the second junction V2.

In accordance with the present invention, the smoothing circuit further includes the ohmic resistor R1, connected to the junction V2 and hence to the cathode of the rectifier diode D2. The capacitor C3 is connected in parallel to the ohmic resistor R1. The function of the smoothing unit G is identical to that described above. With the components listed below, the circuit has a harmonic distortion factor of about 25% and a power factor of about 0.96.

Table 1, illustrates the dimensions of the electrical components for the circuit of FIG. 2, in which the lamp L is a 20 W fluorescent lamp, and the supply voltage is 120 V.

TABLE 1

| R1, R7 | 150 Ω, 5% |
|---|---|
| R2, R9 | 220 KΩ |
| R3, R4 | 0.56 Ω |

TABLE 1-continued

| | |
|---|---|
| R5, R6 | 12 Ω |
| C1, C2 | 47 μF, 100 V_ |
| C3 | 47 nF, 250 V_ |
| C4 | 100 nF, 50 V_ |
| C5 | 4.7 nF, 1000 V_ |
| C6 | 33 nF, 400 V_ |
| C7 | 2.2 nF, 630 V_ |
| C8 | 3.3 nF, 630 V_ |
| C9, C10 | 10 nF, 400 V_ |
| LR | 0.9 mH |
| GL | B250C800 |
| D1, D2, D3, D4 | 1N4004 |

Various changes and modifications may be made within the scope of the inventive concept.

To connect more than one fluorescent lamp to the circuit, any well known and suitable modification may be used; see, for example, the referenced U.S. Pat. No. 4,808,887, Fahnrich et al.

We claim:

1. Minimum harmonic distortion operating circuit for at least one low-pressure discharge lamp, said circuit being adapted to be connected to an a-c power network, comprising a rectifier (GL) adapted to be connected to said power network and supplying rectified d-c energy;

an inverter (WR) receiving said d-c energy and providing a-c energy at a frequency high with respect to the frequency of said a-c power network;

an LC output circuit coupled to the inverter (WR) and supplying the at least one low-pressure discharge lamp (L); and a smoothing circuit (G) connected in parallel to the input of the inverter (WR), said smoothing circuit comprising two electrolytic capacitors (C1, C2) and three rectifying diodes (D1, D2, D3), wherein one diode (D2) is connected with said two capacitors, in series, and polarized to charge said capacitors (C1, C2) over said one (D2) of the three diodes, and the other two diodes (D1, D3) are connected in parallel, one diode each, with one, each, of the capacitors, and polarized to permit discharge of the capacitors to supply the inverter (WR), and wherein the smoothing circuit (G) further comprises the combination of a resistor (R1) and a capacitor (C3) forming a parallel-connected resistor-capacitor (R/C) circuit (R1, C3), said parallel R/C circuit being connected in series with said one diode (D2) and the two electrolytic capacitors (C1, C2), and wherein said capacitor (C3) of the parallel R/C circuit is of a value just sufficient to bypass, with minimum impedance, across said resistor (R1), high-frequency harmonics generated in operation of the inverter (WR) and flowing back to the electrolytic capacitors (C1, C2).

2. The circuit of claim 1, wherein the positive terminal of one (C1) of said two electrolytic capacitors and the cathode of one (D3) of said other two diodes (D1, D3) is connected to the positive output terminal of the rectifier (GL) and with the positive input of the inverter (WR);

the negative terminal of said one electrolytic capacitor (C1) is connected to a first junction (V1) and with the cathode of the other (D1) of said two other diodes (D1, D3);

the negative terminal of the other electrolytic capacitor (C2) and the anode of the first other one (D1) of the rectifier diodes is connected to the negative terminal of the rectifier (GL) and to the negative input of the inverter (WR);

the positive terminal of the second electrolytic capacitor (C2) is connected through a second junction (V2) with the anode of the other one (D3) of said two rectifier diodes (D1, D3);

the first rectifier diode (D2) being connected between said first (V1) and second junctions (V2) and polarized in current-passing direction; and wherein the resistor (R1) of said parallel R/C network is connected between the junctions (V1, V2) in series with respect to said one rectifier diode (D2), and the capacitor (C3) of the parallel R/C circuit bridges said resistor (R1) and bypasses high-frequency a-c components generated by the inverter and flowing back to the electrolytic capacitors (C1, C2).

3. Minimum harmonic distortion operating circuit for at least one low-pressure discharge lamp, said circuit being adapted to be connected to a power network, comprising a rectifier (GL) adapted to be connected to said power network and supplying rectified d-c energy;

an inverter (WR) receiving said d-c energy and providing a-c energy at a frequency high with respect to the frequency of said a-c power network;

an LC output circuit coupled to the inverter (WR) and supplying the at least one low-pressure discharge lamp (L); and a smoothing circuit (G) connected in parallel to the input of the inverter (WR), said smoothing circuit comprising two electrolytic capacitors (C1, C2) and three rectifying diodes (D1, D2, D3), wherein one diode (D2) is connected with said two capacitors, in series, and polarized to charge said capacitors (C1, C2) over said one (D2) of the diodes, and the other two diodes (D1, D3) are connected, one diode each, in parallel with one, each, of the capacitors, and polarized to permit discharge of the capacitors to supply the inverter (WR), and wherein the smoothing circuit further comprises a harmonic suppression and power factor improvement circuit interconnected with the three diodes (D1, D2, D3) and the two electrolytic capacitors (C1, C2) including resistive current control means ([C3,] R1) reducing peak inrush currents during charging of the electrolytic capacitors (C1, C2) and capacitative high-frequency current bypass means (C3) to, capacitatively, and with low impedance, permit flow of high-frequency harmonics generated by the inverter (WR) into the electrolytic capacitors (C1, C2) during discharging of the capacitors, said resistive current control means and said bypass means being connected parallel and forming a parallel resistor (R1)—capacitor (C3) circuit.

4. The circuit of claim 3, wherein the resistance of the resistor forming the parallel connected resistor (R1) and capacitor (C3), in combination with said electrolytic capacitors (C1, C2), forms a time delay network, delaying inrush current flow upon charging of said capacitors.

5. A method to reduce harmonic distortion, while improving the power factor of an operating circuit for at least one low-pressure discharge lamp (L), wherein said operating circuit comprises a rectifier (GL) adapted to be connected to said power network and supplying rectified d-c energy;

an inverter (WR) receiving said d-c energy and providing a-c energy at a frequency high with respect to the frequency of said a-c power network;

an LC output circuit coupled to the inverter (WR) and supplying the at least one low-pressure discharge lamp (L); and a smoothing circuit (G) connected in parallel to the input of the inverter (WR), said smoothing circuit comprising two electrolytic capacitors (C1, C2) and three rectifying diodes (D1, D2, D3), wherein one diode (D2) is connected with said two capacitors, in series, and polarized to charge said capacitors (C1, C2) over said one (D2) of the diodes, and the other two diodes (D1, D3) are connected, one diode, each, in parallel with one, each, of the capacitors, and polarized to permit discharge of the capacitors to supply the inverter (WR), and comprising the steps of reducing inrush current from the rectifier (GL) to said capacitors (C1, C2) of the smoothing circuit arising during a charging phase of said capacitors (C1, C2); and conducting, with low impedance, harmonics generated in operation of the inverter (WR) and back to the electrolytic capacitors (C1, C2) of the smoothing circuit, by passing said inrush current through a parallel-connected resistor (R1)—capacitor (C3) circuit.

6. The method of claim 5, wherein said inrush current reducing step comprises attenuating said inrush current while extending the time of current flow of said so attenuated inrush current.

7. The circuit of claim 1, wherein said capacitor (C3) of the parallel R/C circuit has a capacity value for passage of high-frequency energy between about 30 to 200 kHz with minimum impedance.

8. The circuit of claim 1, wherein the capacitor (C3) of the parallel resistor—capacitor circuit has a capacity value for passage of high-frequency energy between about 30 to 200 kHz with minimum impedance.

* * * * *

UNITED STATES PATENT AND TRADEMARK OFFICE
CERTIFICATE OF CORRECTION

PATENT NO. : 5,714,846
DATED : February 3, 1998
INVENTOR(S) : RASCH et al.

It is certified that error appears in the above-identified patent and that said Letters Patent is hereby corrected as shown below:

Column 8, line 19 (claim 8, line 1),

"of claim 1" should be --of claim 3--.

Signed and Sealed this

Fifth Day of January, 1999

Attest:

Attesting Officer

Acting Commissioner of Patents and Trademarks